United States Patent Office 3,255,036
Patented June 7, 1966

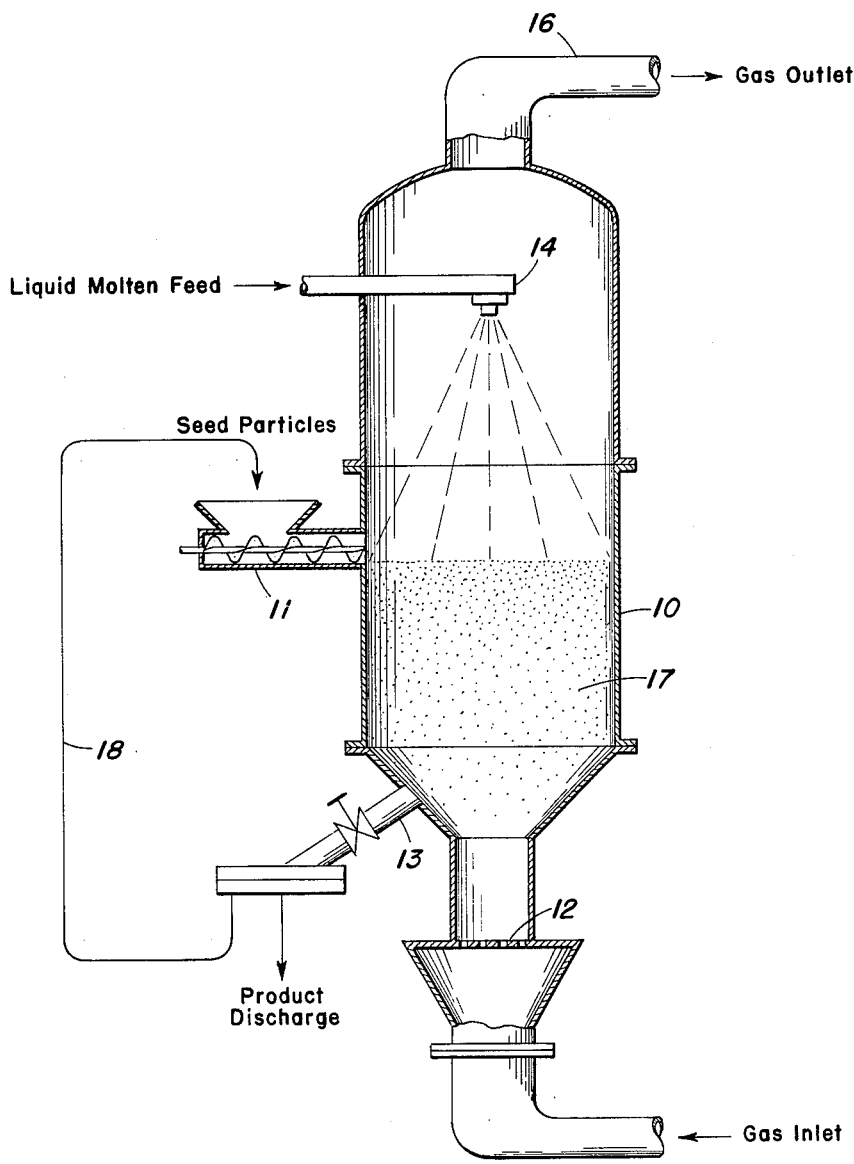

3,255,036
METHOD OF PREPARING PELLETS
Maurice G. Kramer, Grosse Ile, and Joseph V. Otrhalek, Dearborn, Mich., assignors to Wyandotte Chemicals Corporation, Wyandotte, Mich., a corporation of Michigan
Filed Jan. 2, 1962, Ser. No. 163,919
15 Claims. (Cl. 117—100)

This invention relates to a method of preparing dense pelletized compositions. More particularly this invention relates to a method of forming pellets from melts of materials which are solids at ambient temperature.

In the production of sodium hydroxide it is more economical to produce a product containing about 74% sodium hydroxide than anhydrous sodium hydroxide because of the costly evaporation necessary to obtain the anhydrous product. For this reason 74% sodium hydroxide is marketed at a lower price than anhydrous sodium hydroxide and therefore constitutes an economical source of sodium hydroxide. However, heretofore the 74% grade of sodium hydroxide has only been available commercially as a liquid. Numerous pelletizing methods are known in the art; however, none of the known methods are adaptable to the pelletization of 74% sodium hydroxide. It would be very advantageous to produce a pelletized 74% sodium hydroxide product in that such a product would reduce the handling hazard of liquid sodium hydroxide, provide a free-flowing solid of definite size, reduce contamination through corrosion, and reduce shipping costs.

The term 74% sodium hydroxide as used in this application is intended to encompass sodium hydroxide liquor and solids containing 62 to 76 percent by weight of sodium hydroxide and 24 to 38 percent by weight of water.

Therefore it is an object of this invention to provide a method of preparing dense pelletized 74% sodium hydroxide compositions.

Another object of this invention is to provide a method of preparing dense pelletized compositions from melts of materials which are solids at ambient temperature.

A further object of this invention is to provide a novel dense pelletized product.

Other and further objects of the invention will become apparent to those skilled in the art upon consideration of the accompanying disclosure and the drawing which is a diagrammatic representation of apparatus suitable for practicing the method of this invention.

The above and other objects are accomplished by a method for preparing dense pelletized compositions which comprises suspending seed particles in a stream of a nonreactive gas to form a fluidization zone and contacting the suspended seed particles within the fluidization zone with a spray of molten material which is a solid at ambient temperature. In the process, the temperature of the molten material is maintained above its solidification point and the temperature of the fluidization zone is maintained at a temperature of at least about 10° F. below the solidification point of the molten material.

Not only does the pelletizing method of this invention solve the problem of pelletizing 74% sodium hydroxide, but it is also adaptable to the pelletization of any material which is a solid at ambient temperature and from which a melt can be prepared. The method is also useful for preparing pelletized detergents and detergent builders and carrying out reactions. However, it should be noted that only materials which melt without substantial decomposition are useful as the molten material in this invention.

Numerous materials may be pelletized by the process of this invention. Representative of these materials in addition to 74% sodium hydroxide are anhydrous alkali metal hydroxides, such as sodium hydroxide and potassium hydroxide, anhydrous and hydrated calcium chloride, sodium metasilicate pentahydrate, polyurethane intermediates, thermosetting plastics such as Bakelite and styrene and alkylene oxide addition products of organic compounds having at least one reactive hydrogen atom such as alkylene oxide addition products of ethylene diamine, alkylene oxide addition products of propylene glycol and polyethylene glycol. The phrase "reactive hydrogen atom" is defined in column 10 of U.S. 2,674,619.

Alkali metal hydroxides and calcium chloride are difficult to pelletize by methods known in the art because of their hygroscopicity. However, they are readily pelletized by the method of this invention and form dense, free-flowing pellets of uniform size.

Polyurethane intermediates such as the isocyanate-terminated polyether-based polyurethane intermediates which are solids at ambient temperature have heretofore only been available in powdered form. Due to the reactivity of the isocyanate groups with moisture it would be an advantage to prepare the intermediates in a form which would reduce the surface area exposed to moisture in the air. Thus pelletized intermediates prepared by the method of this invention greatly reduce this problem because of the reduced surface area. However, the pelletizing method is not limited to just isocyanate-terminated polyether-based polyurethane intermediates. Hydroxyl-terminated polyether-based intermediates, isocyanate-terminated polyester-based intermediates, and hydroxyl-terminated polyester-based intermediates can also be pelletized by this method.

Alkylene oxide addition products which are the condensation products of alkylene oxides such as ethylene oxide, propylene oxide, butylene oxide, and the like with organic compounds having at least one reactive hydrogen atom are readily pelletized by the method of this invention. The method may be carried out by spraying an alkylene oxide addition product onto seed particles of the same product or of another product depending upon the desired final pelletized product. Thus the molten alkylene oxide addition product and the seed particles can be the same or different. The resulting product is uniform, free-flowing, and dense, and is convenient to package and use.

Thermosetting plastics such as Bakelite and styrene are easily pelletized by this process and result in pellets which are especially useful in preparing molded articles.

Detergents and detergent builders in the pelletized form are prepared by spraying one or more constituents of the product in the molten form onto seed particles of another of the constituents. These products have the advantage of being dense and homogeneous. The process of this invention is especially useful for the preparation of pelletized detergents and detergent builders containing 74% sodium hydroxide. Such products heretofore have been unknown in the art.

Reactions may be carried out by the novel method of this invention. For example pelletized sodium orthosilicate is prepared by spraying molten 74% sodium hydroxide onto seed particles of anhydrous sodium metasilicate. This novel method of preparing sodium orthosilicate eliminates the time-consuming crystallization step in the conventional method of preparing sodium orthosilicate.

Thus it is clear from the foregoing that the method of this invention is adaptable to the pelletization of numerous materials.

In carrying out the method of this invention a melt of the material to be pelletized is first prepared. The material should be a solid at ambient temperature. The temperature of the molten material must be such that it is fluid and can be sprayed without the formation of a solid crust in or around the spray nozzle. For example molten 74% sodium hydroxide at about 200° F. and sodium metasilicate pentahydrate at about 160° F. have been found to be of sufficient temperature for spraying.

The seed particles may vary over a wide particle size range but should be large enough to be retained on a U.S. No. 100 screen or at least about 0.006 inch. They can be of the same material as the melt or of different material. In the process the seed particles are suspended in a gas stream at a velocity sufficient to suspend all of the particles, and thereby a fluidization zone is created in the fluidizing vessel. Due to variations in particle size the use of a tapered fluidizing vessel is desirable so that all the particles will be suspended. Tapered fluidizing vessels are well known in the art. Pure fluidization rather than a spouting type is preferred to prevent sticking of the seeds and to permit easier control.

The gas employed must be nonreactive with the seeds or molten material. Air and nitrogen are examples of two suitable gases. For the pelletizing of hygroscopic materials, such as 74% sodium hydroxide, anhydrous sodium hydroxide, calcium chloride, and the like, it is necessary to employ a gas essentially free of moisture to prevent the particles from sticking together.

The basic process is subject to modifications depending upon the material to be fluidized. Hygroscopic materials, such as alkali metal hydroxide, calcium chloride, and the like, may be pelletized by the basic process; however, the requirement of dry air or nitrogen as the fluidization medium is expensive. Therefore it is preferred that the process be modified for such materials to include a powdered inert inorganic desiccating agent. Representative of the desiccating agents useful are diatomaceous earth, magnesium oxide, sodium sulfate, calcium oxide, aluminum oxide, and the like.

The desiccating agent is either introduced into the gas inlet of the fluidizing vessel or directly into the vessel. Thus an atmosphere of desiccating agent is created within the vessel. Fluidized seed particles are sprayed with the melt of the hygroscopic material according to the basic process previously described. However, the seed particles are sprayed in an atmosphere of the desiccating agent. The use of a desiccating agent in this manner reduces deliquescence of the material and permits the employment of air having a relative humidity of about 10 to 20% at 75° F. for fluidization. Such air is readily obtained by passing atmospheric air through a calcium chloride bed located on the suction side of the compressor. Products prepared in this manner pick up less water than a similar product not containing a desiccating agent and therefore do not readily become sticky and gummy during storage but remain free flowing. Sufficient desiccating agent should be introduced into the fluidized bed to produce a product containing from about 0.25 to 15% desiccating agent based on the total weight.

Molten materials which supercool, such as sodium metasilicate pentahydrate, require the addition of about 10 percent by weight of fines of the material to be pelletized to the melt just prior to spraying to obtain the best results.

The temperature of the fluidization zone is very critical. The fluidization zone must be at a temperature sufficient to prevent the formation of particles from the spray droplets before they contact the seed particles but low enough to cause the spray droplets to solidify after contacting the seed particles. A fluidization zone temperature of at least about 10° F. below the solidification point of the molten material is desirable to obtain the best operation of the process. A practical operating range is from about 10 to 120° F. below the solidification point of the molten material. However when operating at low temperature the distance between the fluidized particles and the spray nozzle must be shortened to prevent the spray droplets from solidifying before they contact the bed. Thus the fluidization medium temperature must be sufficient to maintain the required fluidization zone temperature. However, the temperature of the fluidization zone may be controlled by an outside heating or cooling source instead of by the fluidizing gas.

One or more nozzles of sufficient size to spray the molten material are preferably so placed within the fluidizing vessel that the molten material is sprayed from within the fluidization zone to prevent the droplets from solidifying before contacting the seed particles. The seed particles are sprayed until the pellets are of the desired size.

The process of this invention may be carried out either as batch or continuous process. When operating the process continuously it is convenient to recycle the undersized product back to the fluidizing vessel.

The following examples are presented to particularly illustrate the invention but should not be used to limit unduly the scope of the invention.

*Example 1*

This example illustrates the preparation of pelletized 74% sodium hydroxide by the process of this invention.

The apparatus, illustrated in the drawing and used in all of the examples, was a pilot sized vertical tapered fluidizing vessel 10 having a screw feeder 11 for the seed particles, perforated air distribution plate 12, product discharge leg 13, spray nozzle 14, and a gas exhaust section 16. The spray nozzle was a jacketed, stainless steel, pneumatic atomizing nozzle which produced a round spray, and was located within the fluidization zone 17. Line 18 provides means for recycling undersized material into the vessel with the seed particles.

The apparatus was operated continuously with the undersized material from the product discharge recycled and introduced into the vessel with the seed material.

Dry nitrogen at a temperature of 120° F. is passed through an 80-pound bed of 74% sodium hydroxide seed particles at a rate of 585 cu. ft. per minute. The seed particles are suspended by the nitrogen gas stream and a fluidization zone is formed. A melt of 74% sodium hydroxide at a temperature of about 200° F. is sprayed onto the fluidized seed particles at a rate of 75 pounds per hour while the temperature of the fluidization zone is maintained at about 110° F. Pellets are removed from the vessel, screened on a ¼-inch screen and packaged. The 74% sodium hydroxide pellets are round, dense and homogeneous.

*Example 2*

This example illustrates the preparation of pelletized 74% sodium hydroxide by the process of this invention in which air is employed as the fluidizing medium.

Dehumidified air having a temperature of 120° F. and a relative humidity of 19% at 75° F. and which contained powdered diatomaceous earth introduced into the air inlet at the rate of 8 pounds per hour was passed through an 80-pound bed of 74% sodium hydroxide seed particles at a rate 585 cu. ft. per minute. The seed particles were suspended by the air stream in at atmosphere of diatomaceous earth and formed a fluidization zone. Molten 74% sodium hydroxide at a temperature of about 200° F. was sprayed onto the fluidized seed particles at a rate of 75 pounds per hour while maintaining the fluidization zone at about 110° F. Pellets were removed from the vessel, screened on a ¼-inch screen and packaged. The undersized pellets plus additional 74% sodium hydroxide seed particles were continuously recycled at a rate of 130 pounds per hour. The 74% sodium hydroxide pellets formed were round, dense and homogeneous.

*Example 3*

This example illustrates the preparation of a pelletized 74% sodium hydroxide detergent builder by the process of this invention.

Dry nitrogen at a temperature of about 120° F. is passed through an 80-pound bed of sodium carbonate seed particles at a rate of about 580 cu. ft. per minute; the seed particles are suspended by the nitrogen gas stream and a fluidization zone is formed. A melt of 74% sodium hydroxide at a temperature of about 200° F. is sprayed onto the fluidized seed particles at a rate of about 75 pounds per hour while the temperature of the fluidization zone is maintained at about 110° F. The round dense homogeneous 74% sodium hydroxide pellets are removed from the vessel and screened on a ¼-inch screen and packaged.

*Example 4*

This example illustrates the preparation of a pelletized 74% sodium hydroxide detergent builder by the process of this invention.

Dehumidified air having a temperature of about 120° F. and a relative humidity of 19% at 75° F. and which contained powdered diatomaceous earth introduced into the air inlet at the rate of 8 pounds per hour was passed through an 80-pound bed of sodium carbonate seed particles at the rate of about 580 cu. ft. per minute. The seed particles were suspended by the air stream in an atmosphere of diatomaceous earth and formed a fluidization zone. Molten 74% sodium hydroxide at a temperature of about 200° F. was sprayed onto the fluidized seed particles at a rate of about 75 pounds per hour while maintaining the fluidization zone at about 110° F. The round dense homogeneous pellets were removed from the vessel and screened on a ¼-inch screen and packaged.

*Example 5*

This example illustrates the preparation of a pelletized 74% sodium hydroxide detergent builder by the process of this invention.

Dehumidified air having a temperature of 120° F. and a relative humidity of 19% at 75° F. and which contained powdered diatomaceous earth introduced into the air inlet at the rate of 8 pounds per hour was passed through an 80-pound bed of sodium carbonate seed particles at a rate of 578 ft.³/min. The seed particles were suspended by the air stream in an atmosphere of diatomaceous earth and formed a fluidization zone. A melt containing 95.8% of 74% sodium hydroxide and a 4.2% of 50% gluconic acid at a temperature of 194 to 215° F. was sprayed onto the fluidized seed particles at a rate of 74 pounds per hour. Pellets were removed from the vessel after a 31-minute holdup time and screened on a ¼-inch screen and packaged. The undersized pellets plus sodium carbonate were continuously recycled at a rate of 140 pounds per hour. The temperature of the fluidization zone was maintained at 104 to 122° F. during the operation. The pellets of detergent builder obtained were round, dense and homogeneous and had the following composition:

| | Percent |
|---|---|
| Sodium hydroxide (74%) | 50.1 |
| Sodium carbonate | 45.0 |
| Gluconic acid (50%) | 2.2 |
| Diatomaceous earth | 2.7 |
| | 100.0 |

*Example 6*

This example illustrates the preparation of another pelletized 74% sodium hydroxide detergent builder by the process of this invention.

Dehumidified air having a temperature of 78 to 86° F. and a relative humidity of about 20% at 75° F. and which contained powdered diatomaceous earth introduced into the air inlet at the rate of 6.23 pounds per hour was passed through an 80-pound bed of sodium carbonate seed particles at a rate of 253 cu. ft. per minute. Seed particles were suspended by the air stream in an atmosphere of diatomaceous earth and formed a fluidization zone. A melt containing 89.0% of 74% sodium hydroxide, 9.8% anhydrous sodium metasilicate fines and 1.2% sodium carboxymethylcellulose at a temperature of 200 to 205° F. was sprayed onto the fluidized seed particles at a rate of 76 pounds per hour. The temperature of the fluidization zone was maintained at 95 to 104° F. during the operation. The pellets formed were continuously removed from the vessel and screened on a ¼-inch screen and packaged. The undersized pellets plus sodium carbonate were continuously recycled at a rate of 187 pounds per hour. The pellets of detergent builder obtained were round, dense and homogeneous and had the following composition:

| | Percent |
|---|---|
| Sodium hydroxide (74%) | 67.4 |
| Anhydrous sodium metasilicate | 7.4 |
| Sodium carboxymethylcellulose | 0.9 |
| Sodium carbonate | 18.0 |
| Diatomaceous earth | 6.3 |
| | 100.0 |

*Example 7*

This example illustrates the preparation of pelletized sodium metasilicate pentahydrate by the process of this invention.

Dehumidified air having a relative humidity of 10 to 15% calculated at 75° F. at a temperature of about 105 to 113° F. was passed through an 80-pound bed of sodium metasilicate pentahydrate seed particles at a rate of 515 cu. ft. per minute. The seed particles were suspended in the air stream and formed a fluidization zone. The fluidized sodium metasilicate pentahydrate seed particles were sprayed with molten sodium metasilicate pentahydrate at a rate of 60 pounds per hour. The melt was at a temperature of about 160 to 170° F. and was seeded with 10% sodium metasilicate pentahydrate fines just prior to spraying. The round, dense, homogeneous pellets formed were continuously removed from the vessel and screened on a ¼-inch screen and packaged. The undersized material was recycled to the vessel with the seed material.

*Example 8*

This example illustrates the preparation of pelletized sodium orthosilicate by the process of this invention.

Dry nitrogen having a temperature of about 82 to 93° F. is passed through an 80-pound bed of anhydrous sodium metasilicate seed particles at a rate of 428 to 507 cu ft. per minute. The seed particles are suspended by the air stream and molten 74% sodium hydroxide is sprayed onto the fluidized seed particles at a rate of about 74 pounds per hour while maintaining the temperature of the fluidization zone at 115 to 125° F. Round, dense, homogeneous pellets of sodium orthosilicate are removed from the vessel and screened on a ¼-inch screen and packaged.

*Example 9*

This example also illustrates the preparation of pelletized sodium orthosilicate by the process of this invention.

Dehumidified air having a temperature of 82 to 93° F. and a relatively humidity of 18 to 24% at 75° F. and containing powdered diatomaceous earth which was introduced into the air inlet at the rate of 8.65 pounds per hour was passed through an 80-pound bed of anhydrous sodium metasilicate seed particles at a rate of 428 to 507 cu. ft. per minute. The seed particles were suspended by the air stream in an atmosphere of diatomaceous earth and formed a fluidization zone. Molten 74% sodium hydroxide at a temperature of 198 to 208° F. was sprayed onto the fluidized seed particles at a rate of 74 pounds per hour while maintaining the temperature of the fluidization zone at 115 to 125° F. Round, dense, homogeneous pellets of sodium orthosilicate were removed from the vessel and screened on a ¼-inch screen and packaged. The undersized pellets plus sodium metasilicate were continuously recycled at a rate of 280 pounds per hour.

*Example 10*

This example illustrates the preparation of pelletized anhydrous sodium hydroxide by the process of this invention.

Dry nitrogen is passed through an 80-pound bed of anhydrous sodium hydroxide seed particles. The seed particles are suspended by the gas stream and form a fluidization zone. Molten anhydrous sodium hydroxide at a temperature of about 710° F. is sprayed onto the fluidized seed particles while maintaining the fluidization zone at a temperature of about 580° F. The round, dense, homogeneous pellets are removed from the vessel and screened on a ¼-inch screen and packaged. The undersized pellets are continuously recycled.

*Example 11*

This example also illustrates the preparation of pelletized anhydrous sodium hydroxide by the process of this invention.

Dehumidified air having a relative humidity of 10% at 75° F. and containing diatomaceous earth introduced into the air inlet at the rate of 8 pounds per hour is passed through an 80-pound bed of anhydrous sodium hydroxide seed particles. The seed particles are suspended by the air stream in an atmosphere of diatomaceous earth and form a fluidization zone. Molten anhydrous sodium hydroxide at a temperature of about 710° F. is sprayed onto the fluidized seed particles while maintaining the fluidization zone temperature at about 580° F. The round, dense, homogeneous pellets of anhydrous sodium hydroxide are removed from the vessel and screened on a ¼-inch screen and packaged. The undersized pellets are continuously recycled.

*Example 12*

This example illustrates the preparation of pelletized anhydrous calcium chloride by the process of this invention.

Dry nitrogen is passed through an 80-pound bed of anhydrous calcium chloride seed particles. The seed particles are suspended by the gas stream and form a fluidization zone. Molten anhydrous calcium chloride is sprayed onto the fluidized seed particles at a temperature of about 1500° F. while maintaining the fluidization zone at a temperature of about 1400° F. The round, dense, homogeneous pellets are removed from the vessel and screened on a ¼-inch screen and packaged. The undersized pellets are continuously recycled.

*Example 13*

This example also illustrates the preparation of pelletized anhydrous calcium chloride by the process of this invention.

Dehumidified air having a relative humidity of 10% at 75° F. and containing diatomaceous earth introduced into the air inlet at the rate of 8 pounds per hour is passed through an 80-pound bed of anhydrous calcium chloride seed particles. The seed particles are suspended by the air stream in an atmosphere of diatomaceous earth and form a fluidization zone. Molten anhydrous calcium chloride at a temperature of about 1500° F. is sprayed onto the fluidized seed particles while maintaining the fluidization zone temperature at about 1400° F. The round, dense, homogeneous pellets of anhydrous calcium chloride are removed from the vessel and screened on a ¼-inch screen and packaged. The undersized pellets are continuously recycled.

*Example 14*

This example illustrates the preparation of pelletized hydrated calcium chloride by the process of this invention.

Dehumidified air having a relative humidity of 16% at 75° F. and containing diatomaceous earth introduced into the air inlet at the rate of about 8 pounds per hour was passed through a bed of 77 to 80% $CaCl_2$ flake chip seed particles about ⅛ inch in diameter. The seed particles were suspended by the air stream in an atmosphere of diatomaceous earth and formed a fluidization zone. Molten 55% $CaCl_2$ at a temperature of about 110° F. was sprayed onto the fluidized seed particles while maintaining the fluidization zone temperature at about 90° F. The round, dense, homogeneous pellets of hydrated calcium chloride were removed from the vessel and screened on a ¼-inch screen and packaged. The pellets produced contained 65% $CaCl_2$ and 3.5% diatomaceous earth.

*Example 15*

This example illustrates the preparation of a pelletized alkylene oxide addition product of an organic active hydrogen compound by the process of this invention.

A pelletized ethylene oxide-propylene oxide condensation product of ethylene diamine of the type described in U.S. 2,979,528 and U.S. 2,674,619 having an average molecular weight of 27,000 with an average molecular weight of the propylene oxide-ethylene diamine base of 4,000 and with a polyoxyethylene content of 85% (Tetronic 908—Wyandotte Chemicals Corporation) is prepared by passing a stream of air through a bed of seed particles of the ethylene oxide-propylene oxide condensation product of ethylene diamine and forming a fluidization zone. The fluidized seed particles are sprayed with a melt of the ethylene oxide-propylene oxide condensation product of ethylene diamine at a temperature of about 150° F. within the fluidization zone while maintaining the temperature of the fluidization zone at 15 to 30° F. below the solidification point of the condensation product. The round, dense pellets formed are removed and then screened and packaged.

*Example 16*

This example illustrates the preparation of another pelletized alkylene oxide addition product of an organic active hydrogen compound by the process of this invention.

A pelletized polyoxyethylene-polyoxypropylene condensation product of propylene glycol of the type described in U.S. 2,674,619 having a molecular weight of 8,000 with an average molecular weight of the polyoxypropylene constituent of 1750 and with an average content of polyoxyethylene of 80% (Pluronic F68—Wyandotte Chemicals Corporation) is prepared by passing a stream of air through a bed of seed particles of the polyoxyethylene - polyoxypropylene condensation product of propylene glycol and forming a fluidization zone. The fluidized seed particles are sprayed with a melt of the polyoxyethylene-polyoxypropylene condensation product of propylene glycol at a temperature of about 140° F. within the fluidization zone while maintaining the temperature of the fluidization zone at 15 to 30° F. below the solidification point of the condensation product. The round, dense pellets formed are removed and then screened and packaged.

*Example 17*

This example illustrates the preparation of still another pelletized alkylene oxide addition product of an organic active hydrogen compound by the process of this invention.

Pelletized polyethylene glycol having a molecular weight of 7,000 is prepared by passing a stream of air through a bed of seed particles of the polyethylene glycol and forming a fluidization zone. The fluidized seed particles are sprayed with a melt of the polyethylene glycol at a temperature of about 170° F. within the fluidization zone while maintaining the temperature of the fluidization zone at 15 to 30° F. below the solidification point of the polyethylene glycol. The round, dense pellets formed are removed and then screened and packaged.

*Example 18*

This example illustrates the preparation of a pelletized polyurethane intermediate by the process of this invention.

A pelletized isocyanate - terminated polyether - based polyurethane intermediate which is the reaction product of 3 mols of tolylene diisocyanate and 1 mol of a propylene oxide derivative of trimethylolpropane having a molecular weight of 740 is prepared by passing a stream of air through a bed of seed particles of the polyurethane intermediate and forming a fluidization zone. The fluidized seed particles are sprayed with a melt of the polyurethane intermediate at a temperature of about 260° F. within the fluidization zone while maintaining the temperature of the fluidization zone at about 15 to 30° F. below the solidification point of the polyurethane intermediate. The round, dense pellets formed are removed and then screened and packaged.

It should be apparent from the foregoing that a novel pelletizing method has been discovered. The method permits the pelletization of numerous materials including some materials that heretofore have been very difficult to pelletize by conventional means. This invention is intended to embody the pelletization of any material which is a solid at ambient temperature and from which a melt can be prepared. The dense, homogeneous pelletized products prepared by the method of this invention are also considered as an embodiment of this invention.

We claim:

1. A method of preparing a dense pelletized composition, which comprises, suspending solid seed particles having a particle size of a least about 0.006 inch in a stream of an essentially dry, nonreactive fluidizing gas so as to form a fluidization zone, contacting said seed particles within said fluidization zone with a spray of liquid, molten material which is a solid at ambient temperature, the temperature of said spray of liquid molten material being above the solidification temperature of said material, the temperature of said fluidization zone being at least about 10° F. below the solidification temperature of said molten material, said liquid molten material being selected from the group consisting of:
   (1) sodium hydroxide containing about 24 to 38% by weight of water;
   (2) sodium metasilicate pentahydrate containing about 10% by weight of sodium metasilicate pentahydrate fines;
   (3) anhydrous calcium chloride;
   (4) anhydrous alkali metal hydroxide;
   (5) alkylene oxide addition product with an organic compound having at least one active hydrogen atom;
   (6) isocyanate - terminated, polyether - based polyurethane intermediate;
   (7) hydroxyl-terminated, polyether-based polyurethane intermediate;
   (8) isocyanate - terminated, polyester - based polyurethane intermediate; and,
   (9) hydroxyl-terminated, polyester-based polyurethane intermediate;
said seed particles being the same material in solid form that is employed as said molten material and depositing solidified molten material on said seed particles to produce said dense pelletized composition.

2. A method according to claim 1 wherein said essentially dry, nonreactive fluidizing gas contains, additionally, particles of an inert inorganic desiccating powder.

3. A method according to claim 1 wherein said liquid molten material is sodium hydroxide containing about 24 to 38% by weight of water and said seed particles consist of sodium hydroxide containing about 24 to 38% by weight of water.

4. A method of preparing dense pelletized sodium metasilicate pentahydrate according to claim 1 wherein said liquid molten material and said seed particles consist of sodium metasilicate pentahydrate.

5. A method of preparing dense pelletized anhydrous calcium chloride according to claim 1 wherein said liquid molten material and said seed particles consist of anhydrous calcium chloride.

6. A method of preparing dense pelletized anhydrous sodium hydroxide according to claim 1 wherein said liquid molten material and said seed particles consist of anhydrous sodium hydroxide.

7. A method according to claim 3 wherein said essentially dry, nonreactive fluidizing gas contains, additionally, particles of an inert inorganic desiccating powder.

8. A method of preparing dense pelletized alkylene oxide addition product with organic compounds having at least one active hydrogen atom according to claim 1 wherein said liquid molten material and said seed particles consist of ethylene oxide-propylene oxide-ethylenediamine condensation product.

9. A method of preparing dense pelletized alkylene oxide addition product with organic compounds having at least one active hydrogen atom according to claim 1, wherein said liquid molten material and said seed particles consist of ethylene oxide-propylene oxide-propylene glycol condensation product.

10. A method of preparing dense pelletized alkylene oxide addition product with organic compounds having at least one active hydrogen atom according to claim 1 wherein said liquid molten material and said seed particles consist of polyethylene glycol.

11. A method of preparing dense pelletized isocyanate-terminated polyether-based polyurethane intermiate according to claim 1 wherein said liquid molten material and said seed particles consist of the reaction product of about three mols of tolylene dissoyanate with about one mol of a propylene oxide condensate of trimethylolpropane.

12. A method of preparing a dense pelletized composition which comprises suspending solid seed particles having a particle size of at least about 0.006 inch in a stream of essentially dry nonreactive fluidizing gas so as to form a fluidization zone, contacting said seed particles within said fluidization zone with a spray of liquid molten material which is a solid at ambient temperature, the temperature of said spray of liquid molten material being above the solidification temperature of said material, the temperature of said fluidization zone being at least about 10° F. below the solidification temperature of said molten material, said liquid molten material being sodium hydroxide containing about 24% to 38% by weight of water, said seed particles being selected from the group consisting of sodium carbonate and anhydrous sodium metasilicate.

13. A method according to claim 12 wherein said liquid molten material is sodium hydroxide containing about 24 to 38% by weight of water and said seed particles are sodium carbonate.

14. A method of preparing dense pelletized hydrated sodium orthosilicate according to the method of claim 12 wherein said liquid molten material is sodium hydroxide containing about 24 to 38% by weight of water and said seed particles consist of anhydrous sodium metasilicate.

15. A method according to claim 13 wherein said essentially dry, nonreactive fluidizing gas contains, additionally, particles of an inert inorganic desiccating powder.

References Cited by the Examiner

UNITED STATES PATENTS

| | | | |
|---|---|---|---|
| 2,474,021 | 6/1949 | Vining | 23—1 |
| 2,561,393 | 7/1951 | Marshall | 23—1 |
| 2,561,394 | 7/1951 | Marshall | 23—1 |
| 2,644,769 | 7/1953 | Robinson | 117—17 |

WILLIAM D. MARTIN, *Primary Examiner.*

MAURICE A. BRINDISI, *Examiner.*

S. W. ROTHSTEIN, MELLER, *Assistant Examiners.*